(12) United States Patent
Han et al.

(10) Patent No.: US 8,492,729 B2
(45) Date of Patent: Jul. 23, 2013

(54) ULTRAVIOLET RAY DETECTION APPARATUS USING NANOCRYSTAL QUANTUM DOT

(75) Inventors: Chang-Soo Han, Daejeon (KR); Sohee Jeong, Daejeon (KR); Ji-hye Lee, Daejeon (KR)

(73) Assignee: Korea Institute of Machinery & Materials, Daejeon (KR)

( * ) Notice: Subject to any disclaimer, the term of this patent is extended or adjusted under 35 U.S.C. 154(b) by 278 days.

(21) Appl. No.: 13/124,118

(22) PCT Filed: Oct. 13, 2009

(86) PCT No.: PCT/KR2009/005866
§ 371 (c)(1),
(2), (4) Date: Apr. 13, 2011

(87) PCT Pub. No.: WO2010/044586
PCT Pub. Date: Apr. 22, 2010

(65) Prior Publication Data
US 2011/0261346 A1 Oct. 27, 2011

(30) Foreign Application Priority Data

Oct. 13, 2008 (KR) .................. 10-2008-0100227

(51) Int. Cl.
*G01J 1/42* (2006.01)
(52) U.S. Cl.
USPC ............................................ 250/372; 356/51

(58) Field of Classification Search
USPC .......................................................... 250/372
See application file for complete search history.

(56) References Cited

U.S. PATENT DOCUMENTS

| | | | | |
|---|---|---|---|---|
| 6,551,493 | B2 * | 4/2003 | Mori et al. | 205/775 |
| 6,576,155 | B1 | 6/2003 | Barbera-Guillem | |
| 7,432,577 | B1 * | 10/2008 | Weiss et al. | 257/449 |
| 2003/0013109 | A1 * | 1/2003 | Ballinger et al. | 435/6 |
| 2005/0224780 | A1 * | 10/2005 | Jin et al. | 257/13 |
| 2006/0214903 | A1 * | 9/2006 | Kurosaka | 345/102 |
| 2007/0225402 | A1 * | 9/2007 | Choi et al. | 523/160 |

FOREIGN PATENT DOCUMENTS

| | | |
|---|---|---|
| KR | 10-0131427 | 12/1997 |
| KR | 20-0389543 | 7/2005 |
| KR | 10-2006-0080437 | 7/2006 |
| KR | 10-0744351 | 7/2007 |

OTHER PUBLICATIONS

International Search Report for International Patent Application No. PCT/KR2009/005866 dated May 19, 2010.

* cited by examiner

*Primary Examiner* — Marcus Taningco
(74) *Attorney, Agent, or Firm* — Pearl Cohen Zedek Latzer, LLP

(57) ABSTRACT

An ultraviolet rays detection apparatus according to the present invention includes a color converting unit including nanocrystal quantum dots and having a color that is changed by irradiation of ultraviolet rays, and a non-color-converting unit disposed closer to the color converting unit and having a color that is not changed by the irradiation of the ultraviolet rays, thereby easily detecting the ultraviolet rays.

13 Claims, 4 Drawing Sheets
(2 of 4 Drawing Sheet(s) Filed in Color)

5cm
(a)

8cm
(b)

11cm
(c)

15cm
(d)

20cm
(e)

ULTRAVIOLET RAY DETECTION APPARATUS USING NANOCRYSTAL QUANTUM DOT

CROSS-REFERENCE TO RELATED APPLICATIONS

This application is a National Phase Application of PCT International Application No. PCT/KR2009/005866, International Filing Date Oct. 13, 2009, claiming priority of Korean Patent Application No. 10-2008-0100227 filed on Oct. 13, 2008, both of which are incorporated herein in their entirety.

TECHNICAL FIELD

The present invention relates to an ultraviolet ray detection apparatus, and in detail, to an ultraviolet ray detection apparatus using a nanocrystal quantum dot.

BACKGROUND ART

Light of an ultraviolet ray wavelength occurs in various ways, such as in natural light generated from sunlight and in light that is intentionally generated. Also, light of an ultraviolet ray wavelength is an increasing source of alarm regarding environmental pollution as industry techniques are developed at home and abroad, and the environmental pollution is serious due to discharge of environmental pollution material by a high population density and population concentration of a big city, and an increasing usage amount of energy.

Accordingly, a technique for monitoring and controlling environmental influence is needed to correctly determine a state of the environmental pollution.

Particularly, ultraviolet rays critically influence a human body, and ultraviolet rays as a spectrum of sunlight of 100-400 nm is divided into UVA (315-400 nm), UVB (280-315 nm), and UVC (100-280 nm) according to the wavelength range. UVA that accounts for 98% of the entire ultraviolet rays generates wrinkles and aging, UVC is mostly absorbed in the ozone layer and exists at a tiny amount at the earth surface, and UVB at 2% generates cataracts, skin cancer, and immunity deterioration such that it is the critical wavelength range.

According to a report of the National Cancer Institute (NCI), it is known that more than 600,000 cases of skin cancer were generated in only one year of 1999. According to NCI statistics of 2007, it is reported that the generation of skin cancer is estimated to be more than 1,000,000 persons in total, and life accidents affecting 2000 persons are generated.

A conventional ultraviolet ray detection apparatus mainly uses an organic dye or a semiconductor material, and is generally manufactured as a sensor for detecting ultraviolet rays.

The ultraviolet ray detection apparatus using an organic dye as a passive element has drawbacks such as a very short lifespan and bad chemical and optical stability, while in the sensor that is manufactured by coating a semiconductor material as the active element, the ultraviolet rays are measured through the semiconductor element that is electrically changed by the light that is optically irradiated. It has excellent accuracy, however it has a high price and a complicated structure.

The above information disclosed in this Background section is only for enhancement of understanding of the background of the invention and therefore it may contain information that does not form the prior art that is already known in this country to a person of ordinary skill in the art.

DISCLOSURE

Technical Problem

The present invention provides an ultraviolet ray detection apparatus that is capable of easily detecting existence of ultraviolet rays and intensity thereof.

Technical Solution

An ultraviolet rays detection apparatus according to an exemplary embodiment of the present invention includes: a color converting unit including nanocrystal quantum dots and having a color that is changed by irradiation of ultraviolet rays; and a non-color-converting unit disposed closer to the color converting unit and having a color that is not changed by the irradiation of the ultraviolet rays.

The color converting unit and the non-color-converting unit may include particles and are mixed and deposited to thereby form a layer, and the ultraviolet ray detection apparatus may further include a substrate disposed on or under the color converting unit.

The color converting unit may be made of a color converting layer in which the particles are continuously disposed, and the non-color-converting unit may be made of a non-color-converting layer in which the particles are continuously disposed. The non-color-converting layer may be disposed on the color converting layer and may be translucent.

The non-color-converting layer may be disposed under the color converting layer, and the color of the color converting unit expressed by the irradiation of the ultraviolet rays and the color of the non-color-converting unit may have a complementary color relationship.

The non-color-converting layer may be made of a substrate having a color. A comparison color table having the color that is changed according to irradiation intensity of the ultraviolet rays may be attached.

The color converting layer may be formed by spincoating a solution including the nanocrystal quantum dots, and the nanocrystal quantum dots may be made of one material selected from a group including group 2-3 family materials, group 3-5 family materials, and group 4 family materials, or combinations thereof.

The nanocrystal quantum dots may further include an inorganic shell enclosing a surface, and the non-color-converting unit may be made of one material selected from a group including a dye, a metal, a fluorescent substance, and a polymer, or combinations thereof.

Advantageous Effects

In the present invention, the ultraviolet ray detection apparatus may confirm the existence and intensity of ultraviolet rays through a change of the color by a combination of the color converting unit including the nanocrystal quantum dots and the non-color-converting unit.

Particularly, after the color converting unit and the non-color-converting unit are separately formed, they are overlapped with each other to confirm the change of the color such that the color converting unit may be easily formed by spincoating.

Also, the colors of the color converting unit and the non-color-converting unit have a complimentary color relationship such that the change of the color may be easily recognized, and the comparison color table is provided such that the ultraviolet ray index according to the change of the color may be easily analyzed.

DESCRIPTION OF DRAWINGS

The patent or application file contains at least one drawing executed in color. Copies of this patent or patent application publication with color drawings will be provided by the U.S. Patent and Trademark Office upon request and payment of the necessary fee.

DESCRIPTION OF REFERENCE NUMERALS INDICATING PRIMARY ELEMENTS IN THE DRAWINGS

Figure 1:
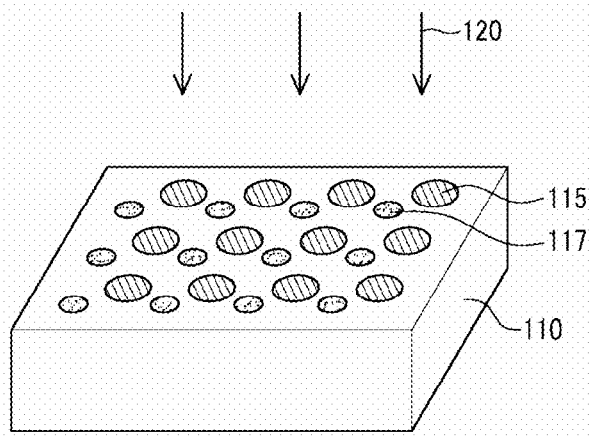
FIG. 1 is a perspective view of an ultraviolet ray detection apparatus according to the first exemplary embodiment of the present invention.

110, 141: substrate
115: color converting unit
117: non-color-converting unit
120: ultraviolet rays
132, 143, 153: color converting layer
134, 142, 151: non-color-converting layer
200: color comparison table

MODE FOR INVENTION

In the present invention, "nano-size" means a size of a portion forming a material such as a diameter, a thickness, a width, or a length.

Also, in the present invention, the word "on" will be understood as positioned on or below a subject member, and does not necessarily mean positioned on the upper part based on the gravity direction.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

FIG. 1 is a perspective view of an ultraviolet ray detection apparatus according to the first exemplary embodiment of the present invention.

Referring to FIG. 1, an ultraviolet ray detection apparatus according to the present exemplary embodiment includes a color converting unit 115 made of nanocrystal quantum dots, a non-color-converting unit 117 with which a color is not changed by irradiation of ultraviolet rays 120, and a substrate 110 disposed under them.

The substrate 110 may be made of various transparent materials or non-transparent materials such as polymers. However, when the substrate is positioned on the color converting unit, the substrate may be made of a transparent or translucence material.

As color converting unit 115 is made of the nanocrystal quantum dots, brightness of the color is changed according to the wavelength of the ultraviolet rays 120 and the intensity thereof. In the color converting unit 115, the intensity of the light is changed according to the intensity of the light emitted from the nanocrystal quantum dots such that the color darkens or lightens.

The nanocrystal as a material having crystallizability of a nano-size is referred to as nanocrystal quantum dots when a quantum confinement effect is exhibited, and may be made of various materials. These materials have semiconductor characteristics, and have various band gaps according to the size of the crystals such that the materials absorb light of a smaller wavelength than the band gaps themselves, thereby emitting light of a predetermined wavelength.

The size of the nanocrystal quantum dots is from about 0.1 nm to about 50 nm, and the nanocrystal quantum dots have various electrical, magnetic, and optical uses. Particularly, semiconductor quantum dots having a light emitting characteristic are used for detection expression elements such as oligonucleotide tags, tissue imaging stains, and protein expression probes, and are utilized when measuring a biological compound in vivo and in vitro.

This nanocrystal quantum dots have complexity and high sensitivity compared with a conventional fluorescent material. The nanocrystal quantum dots have a high light absorptive rate for a unit area compared with the conventional organic dye, and characteristics such as high quantum efficiency, excellent chemical and optical stability, a light emitting spectrum that is narrow and balanced, and a Stokes shift as a difference between a larger absorption wavelength and an emission wavelength. Also, absorbance and luminous properties may be systemically changed according to the size of the particles.

The nanocrystal quantum dots may be manufactured by various methods, and in detail, they may be formed through epitaxial growth by molecular beam epitaxy (MBE), or may be formed in a solution phase by a hydrothermal method.

The nanocrystal quantum dots may be coated on a core or a shell to control the properties thereof, and an inorganic shell increases the quantum efficiency of the nanocrystal quantum dots and the chemical and optical stability.

As described above, the nanocrystal quantum dots may be made of a core, or may be made of a combination structure of the core and the shell. Here, the nanocrystal quantum dots that are made of the core, or the core and the shell, may include a group 2-3 family material such as ZnS, ZnSe, ZnTe, CdS, CdSe, CdTe, HgS, HgSe, HgTe, MgS, MGSe, MgTe, CaS, CaSe, CaTe, SrS, SrSe, SrTe, BaS, BaSe, BaTe, GaN, and GaP, a group 3-5 family material such as GaAs, GaSb, InN, InP, and InSb, and a group 4 family material such as Ge and Si.

The color converting unit 115 made of the above-described nanocrystal quantum dots emits when the ultraviolet rays 120 are incident to the nanocrystal quantum dots such that the color is changed.

The nanocrystal quantum dots emit by receiving the ultraviolet rays 120, however it is difficult to recognize the change of the color by the naked eye. Particularly, if the ultraviolet rays 120 are irradiated at a position where the nanocrystal quantum dots are presented, the intensity of the emitted light is changed according to the intensity of the ultraviolet rays, however it is very difficult to clearly recognize the change degree of the color by the naked eye. This because the nanocrystal quantum dots have very high sensitivity and an excellent light emitting characteristic, however it is very difficult to clearly recognize a weak change of the ultraviolet rays 120 by the naked eye.

Accordingly, in the present exemplary embodiment, the non-color-converting unit 117 is formed near the color converting unit 115 to mix two colors such that the change of the color may be easily recognized by the naked eye. The color converting unit 115 and the non-color-converting unit 117 are made of particles and mixed with each other, and formed on the substrate as a layer.

The non-color-converting unit 117 may be made of various materials such as a dye, a metal, and a fluorescent substance, or may be made of natural colors that exist in the natural world.

The color expressed by the color converting unit 115 through the irradiation of the ultraviolet rays 120 and the color expressed by the non-color-converting unit 117 have a complementary color relationship such that the color converting unit 115 and the non-color-converting unit 117 are combined and the change thereof may be easily recognized. The color of the color converting unit 115 is changed according to the intensity of the ultraviolet rays 120, and the color expressed by the color converting unit 115 is a specific color when the intensity of the ultraviolet rays 120 is a maximum. However, this is one example of the present invention, and the color converting unit 115 and the non-color-converting unit 117 may have various colors.

Also, the intensity of the total color that is reacted by the light is changed according to the amount of the nanocrystal quantum dots such that the change degree of the color may be easily controlled by controlling the ratio of the color converting unit 115 and the non-color-converting unit 117.

The non-color-converting unit 117 may be made of a polymer having a specific color, and if the quantum dots are dispersed, there are merits that the shape and size may be variously controlled and manufactured, and a large ultraviolet ray detection apparatus may be manufactured inexpensively through a method such as injection molding.

Figure 2:
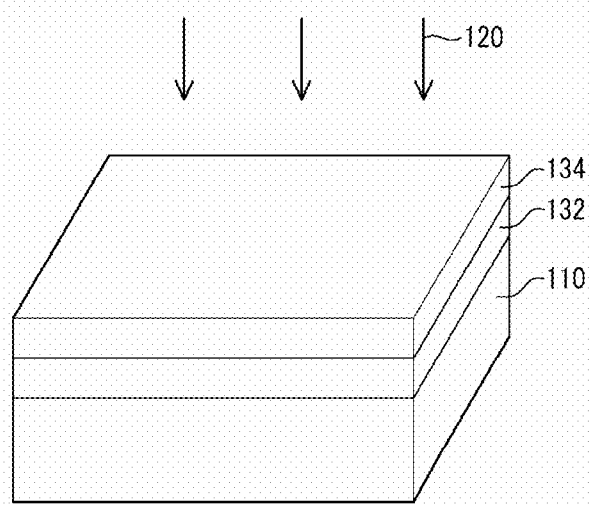
FIG. 2 is a perspective view of an ultraviolet ray detection apparatus according to the second exemplary embodiment of the present invention.

FIG. 2 is a perspective view of an ultraviolet ray detection apparatus according to the second exemplary embodiment of the present invention.

Referring to FIG. 2, an ultraviolet ray detection apparatus according to the present exemplary embodiment includes a substrate 110, a color converting layer 132 formed on the substrate 110 and made of nanocrystal quantum dots, and a non-color-converting layer 134 formed on the color converting layer 132, wherein the color of the non-color-converting layer 134 is not changed by irradiation of the ultraviolet rays 120.

The substrate 110 may be made of glass or a transparent tape.

The non-color-converting layer 134 may be made of an organic dye that does not react with the ultraviolet rays 120, a fluorescent substance, a metal, or a polymer. Also, in the present exemplary embodiment, in a case that the non-color-converting layer 134 is formed on the quantum dots, the non-color-converting layer 134 must have predetermined transparency. If the non-color-converting layer 134 does not have transparency, it is difficult to visually confirm the mixing effect of the color.

Also, the color converting layer 132 is made of the nanocrystal quantum dots, and the material forming the nanocrystal quantum dots is the same as that of the first exemplary embodiment such that a detailed description is omitted. The color converting layer 132 may be formed by coating a solution including the nanocrystal quantum dots, and if the color converting layer 132 is formed in a solution phase, a large color converting layer may be formed inexpensively.

In the present exemplary embodiment, if the color converting layer 132 that is made of the nanocrystal quantum dots of which the color is changed by the ultraviolet rays 120 and the non-color-converting layer 134 of which the color is not changed by the ultraviolet rays 120 are formed to overlap in the up and down direction, the change of the color by the ultraviolet rays 120 may be easily observed.

Figure 3:
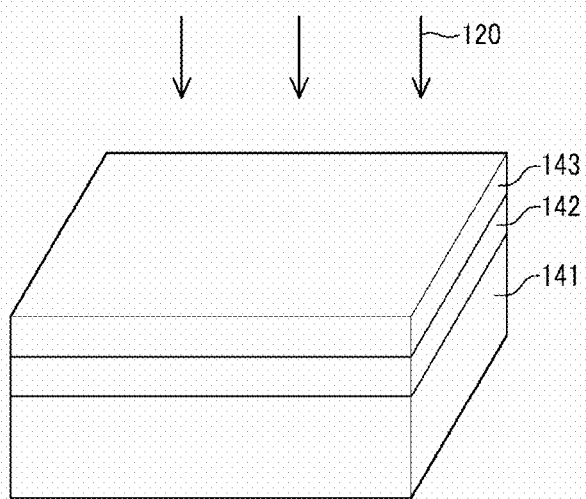
FIG. 3 is a perspective view of an ultraviolet ray detection apparatus according to the third exemplary embodiment of the present invention.

FIG. 3 is a perspective view of an ultraviolet ray detection apparatus according to the third exemplary embodiment of the present invention.

Referring to FIG. 3, a ultraviolet ray detection apparatus according to the present exemplary embodiment includes a substrate 141, a non-color-converting layer 142 formed on the substrate 141 and of which the color is not changed by the ultraviolet rays 120, and a color converting layer 143 formed on the non-color-converting layer 142.

The ultraviolet ray detection apparatus according to the present exemplary embodiment except for the non-color-converting layer 142 positioned on the color converting layer 143 has the same structure as the second exemplary embodiment such that the overlapping description of the same constitutions is omitted.

In the present exemplary embodiment, if the color converting layer 143 is positioned on the non-color-converting layer 142, although the transparency of the non-color-converting layer 142 is low, when the ultraviolet rays 120 are incident a change of color may be easily visually observed.

Figure 4:
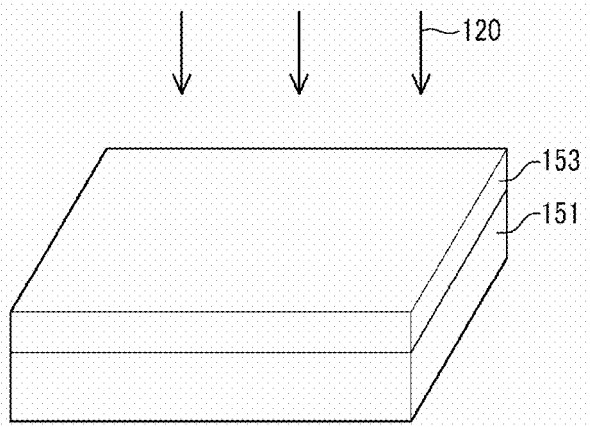
FIG. 4 is a perspective view of an ultraviolet ray detection apparatus according to the fourth exemplary embodiment of the present invention.

FIG. 4 is a perspective view of an ultraviolet ray detection apparatus according to the fourth exemplary embodiment of the present invention.

Referring to FIG. 4, an ultraviolet ray detection apparatus according to the present exemplary embodiment includes a color converting layer 153 made of nanocrystal quantum dots and having a color that is changed by ultraviolet rays 120, and a non-color-converting layer 151 positioned under the color converting layer 153 and having a color that is not changed by ultraviolet rays 120.

The color converting layer 153 according to the present exemplary embodiment is made of the above-described nanocrystal quantum dots, and the material forming the nanocrystal quantum dots is the same as that of the above first exemplary embodiment such that the detailed description is omitted.

The non-color-converting layer 151 according to the present exemplary embodiment is made of glass having the color or a translucence layer including the color such as the tape. Accordingly, the non-color-converting layer 151 functions as the substrate.

Accordingly, the ultraviolet ray detection apparatus according to the present exemplary embodiment may be manufactured by only coating the color converting layer 153 on the non-color-converting layer 151 made of the translucence glass having the color.

In the present exemplary embodiment, the color converting layer 153 is exemplary formed on the non-color-converting layer 151 in the gravity direction, but the present invention is not limited thereto, and the nano-detection apparatus may be turned such that the color converting layer 153 may be disposed on the non-color-converting layer 151.

Also, the color converting layer 153 may be formed by being coated in a solution state, or by being manufactured and attached as a film type.

Figure 5:
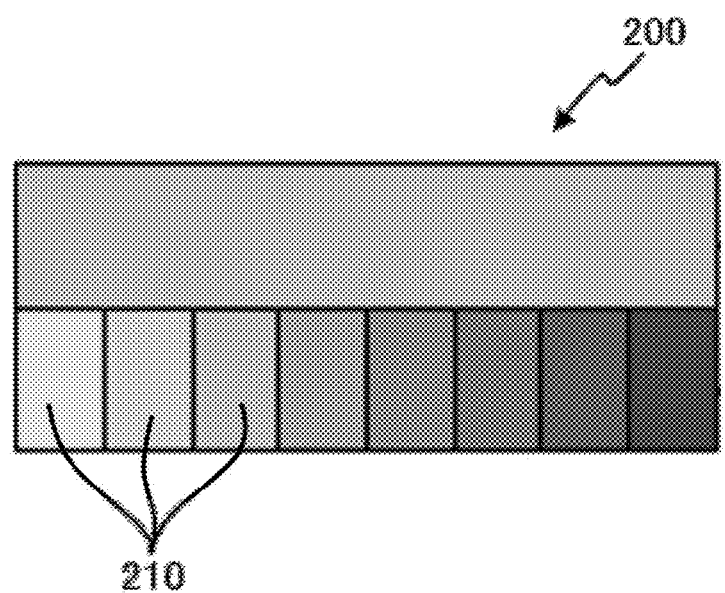
FIG. 5 shows a color comparison table attached to an ultraviolet ray detection apparatus.

FIG. 5 shows a comparison color table attached to an ultraviolet ray detection apparatus.

In the comparison color table 200 shown in FIG. 5, the colors 210 that are changed according to the wavelengths of the ultraviolet rays are shown, and the comparison color table 200 may be attached to a case (not shown) of the ultraviolet ray detection apparatus. If the ultraviolet ray detection apparatus including the nanocrystal quantum dots is used, the change of the color may be recognized, however it is not easy to confirm the intensity of the ultraviolet rays 120 through the change of the color. Accordingly, if an ultraviolet ray index (UVI) is written to the comparison color table 200 attached to the ultraviolet rays detection apparatus, the detailed ultraviolet ray index may be easily confirmed according to the change of the color.

Figure 6:
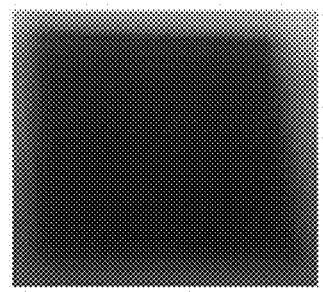
FIG. 6 shows photographs showing results of measuring ultraviolet rays by using an ultraviolet ray detection apparatus manufactured according to the fourth exemplary embodiment of the present invention.
Figure 6:
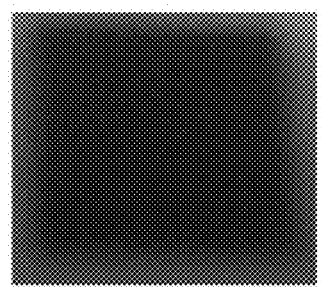
Figure 6:
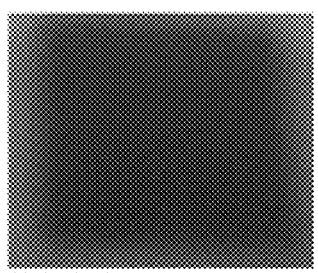
Figure 6:
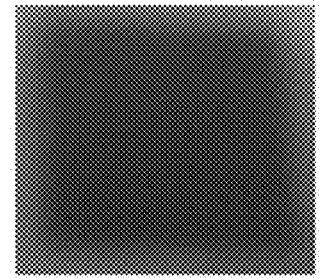
Figure 6:
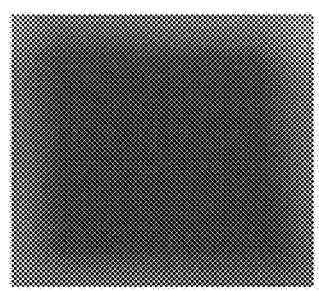

FIG. 6 shows photographs showing a result of measuring ultraviolet rays by using an ultraviolet ray detection apparatus manufactured according to the fourth exemplary embodiment of the present invention.

In the ultraviolet rays detection apparatus according to the present exemplary embodiment, has the color converting layer including the nanocrystal quantum dot formed on the translucence red tape.

The nanocrystal quantum dots consist of CdSe representing green, and after CdSe is dispersed in the solution, the solution including CdSe is coated on a red tape by a spincoating method to manufacture the ultraviolet ray detection apparatus.

FIG. 6(a) is a photograph showing the change of the color of the ultraviolet ray detection apparatus in a state that a UV lamp having a wavelength of 254 nm and separated from the ultraviolet ray detection apparatus by 5 cm is irradiated. As shown in FIG. 6(a), the intensity of the ultraviolet rays is strong and the green is largely emitted such that the green is represented at the edge, and the green and the red are totally overlapped, thereby representing black.

FIG. 6(b) is a photograph showing the change of the color of the ultraviolet ray detection apparatus in a state that a UV lamp having a wavelength of 254 nm and separated from the ultraviolet ray detection apparatus by 8 cm is irradiated. As shown in FIG. 6(b), the intensity of the ultraviolet rays is weaker than in FIG. 6(a) such that the green almost disappears at the edge, however the intensity of the ultraviolet rays is still strong such that the green and the red are totally overlapped, thereby representing black.

FIG. 6(c) is a photograph showing the change of the color of the ultraviolet ray detection apparatus in a state that a UV lamp having a wavelength of 254 nm and separated from the ultraviolet ray detection apparatus by 11 cm is irradiated, FIG. 6(d) is a photograph showing the change of the color of the ultraviolet ray detection apparatus in a state that a UV lamp having a wavelength of 254 nm and separated from the ultraviolet rays detection apparatus by 15 cm is irradiated, and FIG. 6(e) is a photograph showing the change of the color of the ultraviolet ray detection apparatus in a state that a UV lamp having a wavelength of 254 nm and separated from the ultraviolet rays detection apparatus by 20 cm is irradiated.

As shown in FIG. 6(c) to FIG. 6(e), as the lamp moves further away from the ultraviolet ray detection apparatus, the intensity of the ultraviolet rays is decreased such that it may be confirmed that the color of the ultraviolet ray detection apparatus is changed more to red.

As described above, the existence and the intensity of the ultraviolet rays may be confirmed through the change of the color of the ultraviolet ray detection apparatus.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. An ultraviolet rays detection apparatus comprising:
a color converting unit including nanocrystal quantum dots and having a color that is changed by an irradiation of an ultraviolet rays; and
a non-color-converting unit disposed adjacent to the color converting unit and having a color that is not changed by the irradiation of the ultraviolet rays.

2. The ultraviolet rays detection apparatus of claim 1, wherein
the color converting unit and the non-color-converting unit include particles and are mixed and deposited to thereby form a layer.

3. The ultraviolet rays detection apparatus of claim 1, further comprising
a substrate disposed under or on the color converting unit.

4. The ultraviolet ray detection apparatus of claim 1, wherein
the color converting unit is made of a color converting layer in which the particles are continuously disposed, and the non-color-converting unit is made of a non-color-converting layer in which the particles are continuously disposed.

5. The ultraviolet ray detection apparatus of claim 4, wherein
the non-color-converting layer is disposed on the color converting layer and is translucent.

6. The ultraviolet ray detection apparatus of claim 4, wherein
the non-color-converting layer is disposed under the color converting layer.

7. The ultraviolet ray detection apparatus of claim 4, wherein
the non-color-converting layer is made of a substrate having a color.

8. The ultraviolet ray detection apparatus of claim 4, wherein
the color converting layer is formed by spincoating a solution including the nanocrystal quantum dots.

9. The ultraviolet ray detection apparatus of claim 1, wherein
a comparison color table having a color that is changed according to irradiation intensity of the ultraviolet rays is attached.

10. The ultraviolet ray detection apparatus of claim 1, wherein
the color of the color converting unit expressed by the irradiation of the ultraviolet rays and the color of the non-color-converting unit have a complementary color relationship.

11. The ultraviolet ray detection apparatus of claim 1, wherein
the nanocrystal quantum dots are made of one material selected from a group including group 2-3 family materials, group 3-5 family materials, and group 4 family materials, or combinations thereof.

12. The ultraviolet ray detection apparatus of claim 1, wherein
the nanocrystal quantum dots further include an inorganic shell enclosing a surface.

13. The ultraviolet ray detection apparatus of claim 1, wherein
the non-color-converting unit is made of one material selected from a group including a dye, a metal, a fluorescent substance, and a polymer, or combinations thereof.

* * * * *